United States Patent

[11] 3,613,837

| [72] | Inventor | Kaoru Tsubouchi<br>Toyota, Japan |
|---|---|---|
| [21] | Appl. No. | 884,121 |
| [22] | Filed | Dec. 11, 1969 |
| [45] | Patented | Oct. 19, 1971 |
| [73] | Assignee | Aisin Seiki Kabushiki Kaisha<br>Kariya, Japan |
| [32] | Priority | Dec. 21, 1968, Dec. 27, 1968 |
| [33] | | Japan |
| [31] | | 43/93884 and 44/154 |

[54] MECHANICAL BRAKE SYSTEM OF DISK-TYPE
6 Claims, 9 Drawing Figs.

| [52] | U.S. Cl. | 188/72.9, 188/72.2 |
|---|---|---|
| [51] | Int. Cl. | F16d 55/224 |
| [50] | Field of Search | 188/72.2, 72.6, 72.9, 71.7 |

[56] References Cited
UNITED STATES PATENTS

| 2,731,112 | 1/1956 | Berrows | 188/71.7 |
|---|---|---|---|
| 3,258,090 | 6/1966 | Hodkinson | 188/72.9 |

FOREIGN PATENTS

| 953,083 | 3/1964 | Great Britain | 188/72.9 |
|---|---|---|---|

*Primary Examiner*—George E. A. Halvosa
*Attorney*—Pierce, Scheffler & Parker

ABSTRACT: A mechanical brake system for use with a hydraulic disk-type brake device as a parking or emergency brake wherein the mechanical brake comprises a C-shaped caliper swingably mounted above the hydraulic disk brake, a pair of friction linings provided in the caliper on mutually opposite flat sides of the rotatable disk and adapted to engage therewith, a pair of lever plates pivotally mounted on the caliper, lining pressing means pivotally mounted on the lever plates and adapted to engage with one of the linings when the mechanical brake is applied independently of the hydraulic disk-type brake.

INVENTOR.
Kaoru Tsubouchi

INVENTOR.
Kaoru Tsubouchi
BY
Pierce, Schiffler & Parker
Attorneys

MECHANICAL BRAKE SYSTEM OF DISK-TYPE

BACKGROUND OF THE INVENTION

This invention relates to brakes of the disk-type for vehicle Lwheels and more particularly to a mechanical brake system for use with brakes of this type, usually as an emergency or parking brake.

In conventional mechanical brakes of this type in which the braking torque is received directly by a stationary member, the braking effect is usually insufficient because no self-energizing force is generated, and they need many mechanical elements which cause considerable friction. Moreover, if and when the mechanical brake and hydraulic brake are consolidated and assembled into one unit to use common friction linings, difficulties have been encountered: the linings required in the hydraulically operated brake have a large coefficient of friction, a small coefficient of abrasion, and produce no creaks against the rotating disk and thus are expensive while those required for the mechanical brake have a large coefficient of friction and they may have a large coefficient of abrasion and produce creaks. When each brake is arranged independently and the mechanical brake is swingably mounted on a stationary member, however, new problems are presented. One friction lining which is provided in a C-shaped caliper and disposed on the opposite side of the brake disk relative to a pivot pin disposed between the mechanical brake and the stationary member is liable to be worn partially in the forward rotating direction of the brake disk because the caliper having the friction linings is allowed to swing around the pivot. It is not economical to renew the friction lining which is only partially worn.

SUMMARY OF THE INVENTION

It is, therefore, one of the objects of this invention to provide a mechanical brake of the disk-type which is self-energizing and thus is more efficient than conventional types of mechanical brakes.

Another object of this invention is to provide a combined hydraulic brake and a mechanical brake which may conveniently be combined into one compact unit, each brake being operated independently of the other.

Still another object of the invention is to provide an emergency brake of this type in which the friction linings are worn evenly.

A further object of the invention is to provide a mechanical brake of the disk-type which may be economically manufactured and easily assembled. X A still further object of the invention is to provide a mechanically operated brake of this type in which the friction linings are quickly and easily adjustable to compensate for any wear thereon.

The above objects of the present invention are attained by a construction comprising a C-shaped caliper combined with the hydraulic brake, a pair of friction linings carried by the caliper and disposed on mutually opposite sides of the brake disk, lever-plate means pivotally mounted on the caliper member and provided with pressing means, L-shaped link means pivotally connected to the lever-plate means at one end and to a hand lever at its other end, so that when the hand lever is operated to rotate the link means, the pressing means is actuated to allow the brake linings to squeeze the rotatable disk.

With the above and other objects in view, as will hereinafter appear, the invention comprises the devices, combinations and arrangements of parts hereinafter set forth and illustrated in the accompanying drawings of two embodiments of the invention, from which the several features of the invention and the advantages attained thereby will be readily understood by those skilled in the art.

DESCRIPTION OF THE PREFERRED EMBODIMENTS

Figure 1:
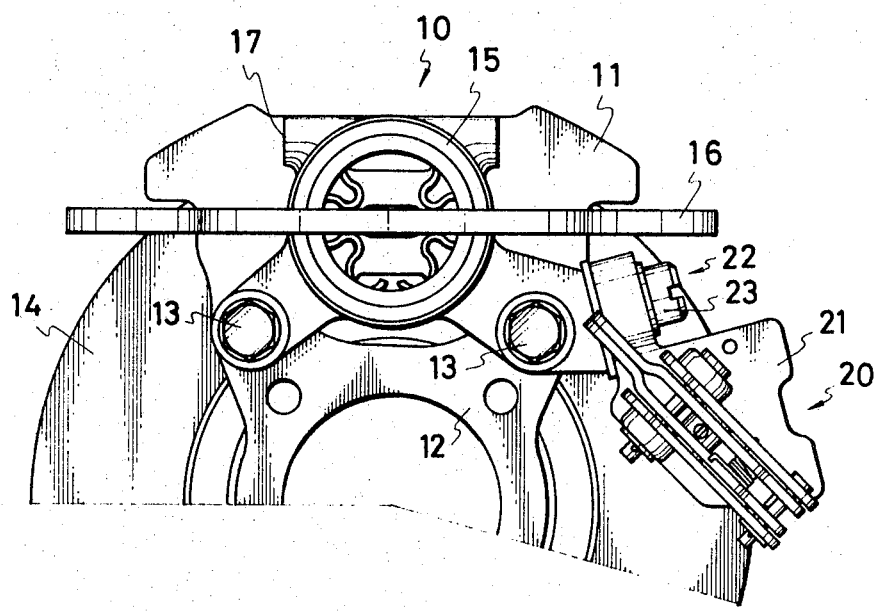
FIG. 1 is a fragmentary elevational view of a conventional hydraulic disk brake and a mechanical brake embodying the present invention.

Referring now in more detail to the drawings and particularly FIG. 1 thereof, the reference character 10 indicates generally a substantially conventional disk-type hydraulically operated brake. The essentials of the disk-type brake 10 will first be described, although this part of the brake construction forms no part of the present invention.

A hydraulic cylinder housing 11 is securely mounted on a stationary member 12 by means of bolts 13 on one side of a brake disk 14 which is fixed integrally and coaxially to a rotating part of a wheel (not shown). The cylinder housing 11 has two guide parts (not shown) extending in a straddling manner over the brake disk 14 to the other side thereof. Within the cylinder housing 11, there are slidably fitted two opposed pistons. The numeral 15 represents one of the pistons, although there is shown only a portion of its outer end in this figure.

There are provided two friction pad assemblies (not shown) between the guide parts and on opposite flat sides of the disk 14. The two pad assemblies are supported by two guide pins (again not shown) secured to the cylinder housing 11 and to the guide parts. A movable member 16 having a yoke or closed-frame shape is held by the piston 15 against one of the friction pads.

In operation, when fluid under pressure is supplied to the cylinder housing 11 from a master cylinder (not shown) through an inlet port 17, the piston 15 is permitted to axially move the yoke member 16 to actuate the one pad disposed axially on the opposite side of the disk 14 as viewed in FIG. 1, while the other piston moves so as to act on the other pad assembly axially of the brake disk and opposite to the piston 15. Thus each flat side of the rotating brake disk 14 is squeezed by the two pad assemblies.

The subject matter of this invention consists in providing a mechanical brake system which is swingable and so self-energizing.

A manually operated brake is generally indicated by the reference character 20. The mechanical brake 20 comprises a caliper like member 21 straddling a portion of the brake disk 14. The caliper 21 of C-shape is pivotally mounted on the hydraulic cylinder body 11 by means of pivot pin 22 with a head 23 so as to be swung substantially in the axial direction of the disk 14. The head 23 of the pin 22 prevents the C-shaped caliper 21 from moving away from the cylinder body 11 in the radial direction of the disk 14.

More particularly, referring to FIGS. 2 to 5, a pair of lever plate means 24 and 25 is pivotally mounted between a pair of lugs 26 and 27 of the caliper member 21, respectively, by a pivot pin 28 which is threaded from the lug 26 to the lug 27 through the upper and lower plates 24 and 25, and at one end of the pivot pin 28, there is integrally provided a head 29, whilst at its other end a split pin 30 is provided. A coupling rod 31 is provided between the plate means 24 and 25 and near the pivot pin 28, which is of substantially cylindrical shape and includes two projections 32 and 33 pivotally mounted in the lever plates 24 and 25, respectively. A screw bolt 34 is carried in a screw hole 35 provided at a substantially central portion of the coupling rod 31 in the brake disk axial direction. The forward end 36 of the bolt 34 is preferably ball-shaped as seen best in FIG. 3. On a rearward end, there is provided a groove 37 in which a screw driver means (not shown) is adapted to rotate the screw 34, for a purpose which will become apparent.

A pair of substantially L-shaped links is indicated generally by the reference numeral 38. The links 38 include upper and lower forked portions 39 and 40, stem portions 41 and 42. The forked portions 39 and 40 of the links 38 are arranged between the lever plates 24 and 25 in substantially parallel relationship therewith, while the stem portions 41 and 42 are rigidly attached to each other as clearly shown in FIG. 2. The forked links 39 and 40 are pivotally mounted on a pivot pin 43 which is threaded in elongated slots on the lever plates 24 and 25, one of which is indicated by the reference numeral 44, (FIG. 3). At one end of the pin 43, there is integrally provided a head 45 whilst at its other end a split cotter pin 46 is provided. The forked links 39 and 40 are also pivotally mounted on a finger portion 47 of a coupling rod 48. A stem portion 49 of the rod 48 is screwed and securely mounted in a hole 50 of the caliper member 21. It will be apparent that when the link means 38 is rotated around the finger portion 47, the lever plates 24 and 25 are also rotated thereby around the pivot 28 through the pin 43.

On the left end of the stems 41 and 42 as viewed in FIG. 3, there is provided a hole 51 to which a mechanical wire cable (not shown) connected to a manually operable lever (again not shown) is attached in order to actuate the link means 38.

Figure 2:
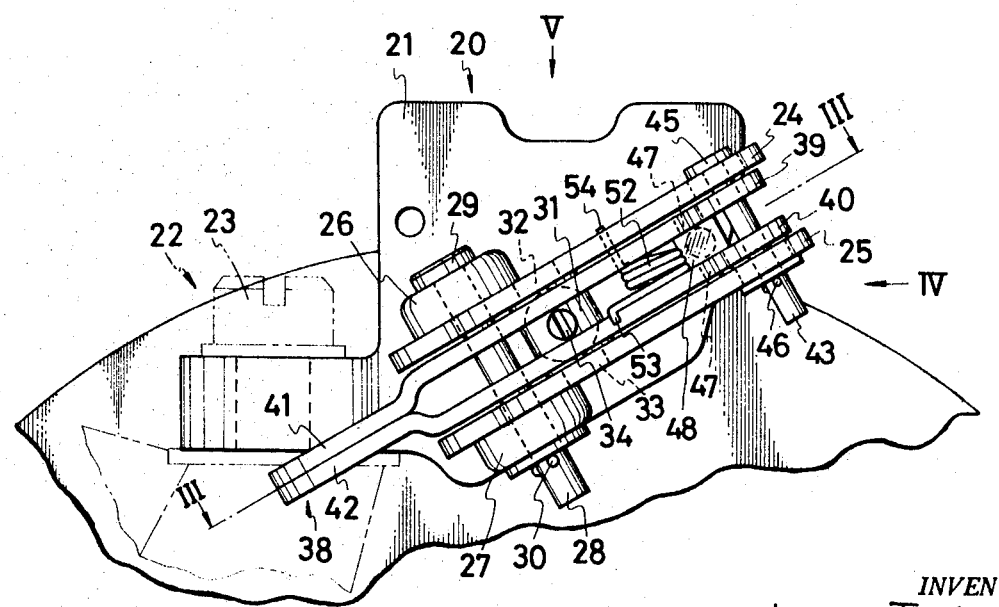
FIG. 2 is a view similar to FIG. 1 showing the mechanical brake system on a larger scale.
Figure 3:
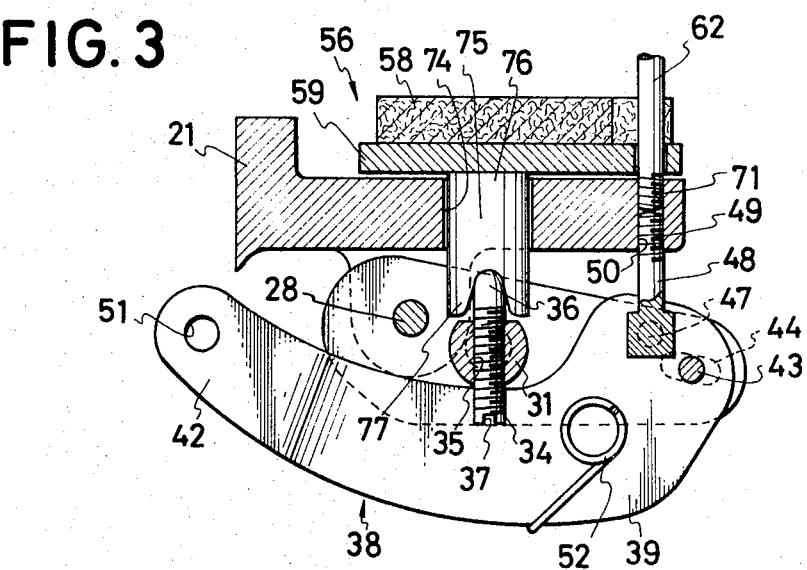
FIG. 3 is a sectional view taken along the line III—III of FIG. 2.

A spiral spring 52 is provided between the forked links 39 and 40 (FIG. 2). One end 53 of the spring 52 is engaged with the lower forked portion 40 whilst the other end 54 thereof is engaged with the upper lever plate 24 through an opening 55 (FIG. 5) provided therein. The spiral spring 52 urges the link means 38 in the forward direction to contact with the coupling rod 31 on one hand, and the upper lever plate 24 in the rearward direction on the other hand, when the mechanical brake is not applied.

Figure 4:
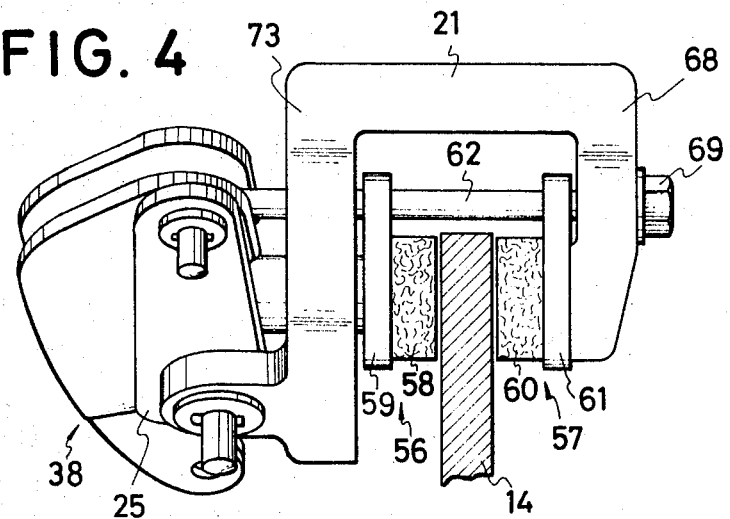
FIG. 4 is a side view of the mechanical brake system as viewed in the direction of the arrow IV of FIG. XXX2.

There are provided first and second friction pad assemblies 56 and 57 on mutually opposite flat sides of the brake disk 14; see FIG. 4. The first pad assembly 56, being positioned on one side of the wheel, consists of a friction lining 58 and a metal back 59 secured thereto, whilst the second pad assembly 57, being positioned on the opposite side of the wheel consists of a friction lining 60 and a metal back 61 secured thereto. Two guide pins 62 and 63 (FIG. 5) for supporting and guiding the pad assemblies 56 and 57 are provided through holes 64 to 67 at the upper sides of the metal backs 59 and 61. At one end the pins 62 and 63 are threaded into the caliper arm 68, nuts 69 and 70 are attached, while the other arm ends 71 and 72 are screwed into the opposite caliper arm 73 relative to the disk 14. The end 71 of the guide pin 62 is carried in the same hole 50 as the coupling rod 48.

At a substantially middle portion of the caliper 73, there is provided a cylindrical opening 74 (FIG. 3) in which a piston 75 is slidably fitted. One end 76 of the piston 75 contacts the metal back 59 while its other end 77 of fork shape receives the forward end 36 of the screw bolt 34 as shown in FIGURE 3.

In operation, when the hand lever is operated, the link means 38 is rotated by the wire cable against the force of the returning spring 52 in the counterclockwise direction around the pivotal finger portion 47 of the coupling Xmember 48 in FIG. 3.

The rotation thereof is transmitted to the lever plate means 24 and 25 through the pivot pin 43, so that the lever plates 24 and 25 are rotated in the same direction around the pivot 28. The coupling rod 31 also pivotally mounted on the plates 24, 25 and rigidly mounting the screw bolt 34 therein is urged to press the piston 75 in the forward direction, whereby one flat side of the brake disk 14 is pressed by the first friction pad assembly 56. The reaction of this movement operates in the opposite direction to actuate the second friction pad assembly 57 through the piston 75, the screw bolt 34, the coupling bolt 31, the lever plates 24 and 25, the finger 47 of the coupling rod 48 and the C-shaped caliper 21, so that the other flat side of the disk 14 is pressed by the second pad assembly 57. Thus the rotatable disk 14 is squeezed by the two pad assemblies 56 and 57.

It is to be recognized that the caliper member 21 is permitted to swing around the pivot 22 in the clockwise direction to allow the pad assemblies to engage with the rotatable disk 14 as viewed in FIG. 3, so that the mechanical brake is rendered self-energizing.

When the hand lever is released, the L-shaped link means 38 is rotated in the clockwise direction (see FIG. 3) to the former position by means of the returning spring 52. If and when the friction linings 58 and 60 are worn beyond a predetermined value during the mechanical brake operation, the clearance between the linings and the brake disk 14 is adjustable by screwing the bolt 34 in the forward direction (in the upward direction as viewed in FIGURE 3) by means of a screw driver or the like. At first the screw bolt 34 is moved forward until the first linings 58 is engaged with the brake disk 14 so that the reaction movement is generated and the wear on the second lining is compensated for by the swing movement of the caliper 21 against the brake disk Subsequently, subsequently, the screw bolt 34 is moved back (in the downward direction in FIG. 3) so as to retain a proper clearance between the first lining 58 and the disk 14.

Figure 5:
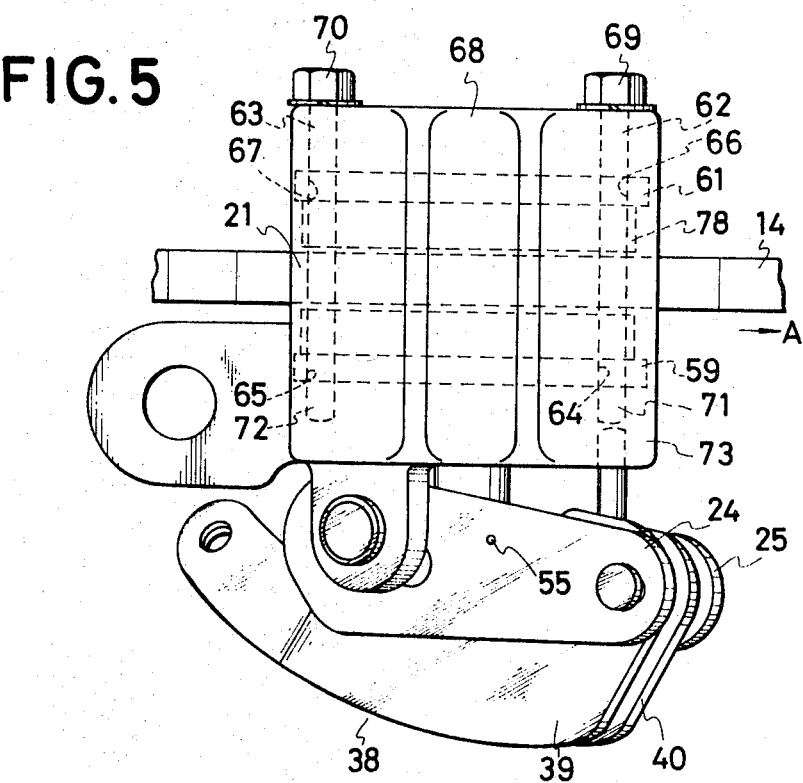
FIG. 5 is a plan view of the mechanical brake system as viewed in the direction of the arrow V of FIG. 2.
Figure 8A:
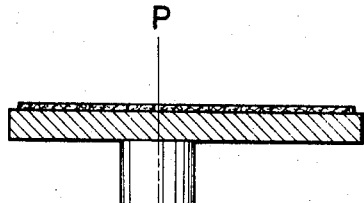
FIG. 8A is a plan view of a plan friction lining according to FIGS. 6 and 7 whilst
Figure 8B:
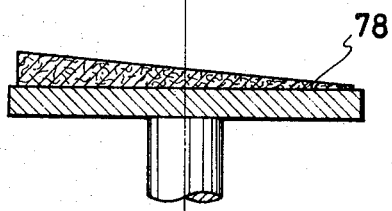
FIG. 8B is a view similar to FIG. 8A of worn a lining according to the FIGS. 1–5, line P—P indicating comparative centers of pressure on each lining.

It is to be noted that the friction lining 60 of the second pad assembly 57 is especially subject to be worn at a part 78 (FIG. 8B) corresponding to the forward rotating direction of the brake disk 14 indicated by arrow A in FIG. 5, because the C-shaped caliper 21 mounting the second pad assembly 57 is swung around the pivot 22 against the rotatable disk 14 in the clockwise direction as viewed in FIG. 5, so that the second lining 60 is partially worn as illustrated in FIG. 8B. This is not economical and undesirable.

Figure 6:
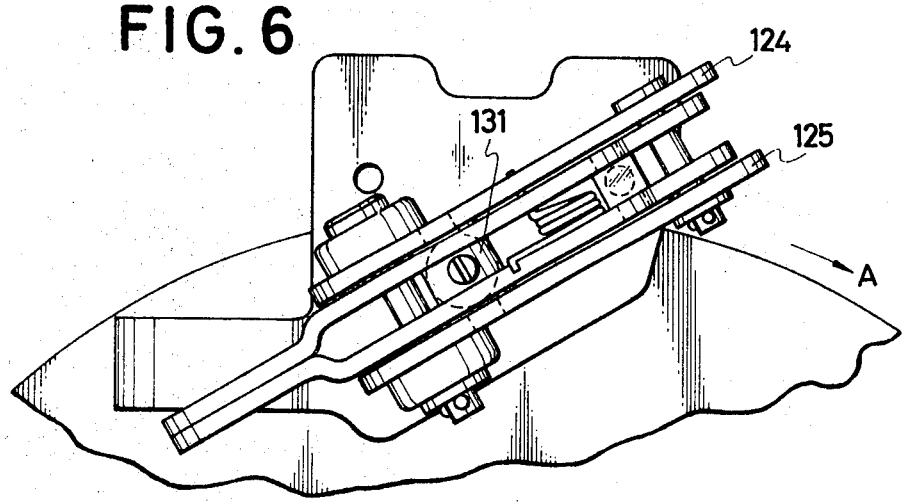
FIG. 6 is a view similar to FIG. 2 showing a modified form of the invention.
Figure 7:
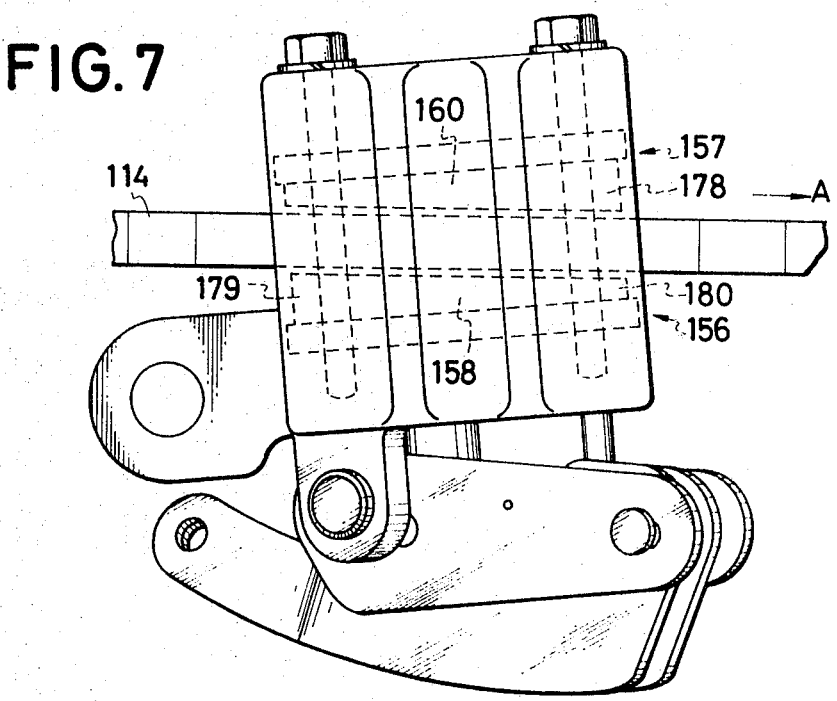
FIG. 7 is a plan view of the modified brake system shown in FIG. 6.

In order to overcome the above difficulty, a modification of this invention is shown in FIGS. 6 and 7, which operates in substantially the same manner. In these figures, similar parts to those employed in the foregoing embodiment have the same reference numerals plus 100.

First and second pad assemblies 156 and 157 have linings 158 and 160, respectively. The lining 160 is of a thickness progressively becoming thick in the forward rotating direction A of a brake disk 114 (FIG. 7). On the contrary, the thickness of the first lining 158 is becoming thin in the same direction: it is desirable and economical to manufacture the linings in the same manner or in the same machine, and so the same as second linings are preferably the same as the first linings. However, if the first pad assembly 156 is thrust at the central portion thereof as in the first embodiment, the lining 158 will be worn in substantially parallel relationship with the flat side of the brake disk 114 so that finally it is worn as illustrated in FIG. 8B.

According to the second embodiment of this invention, the first pad assembly 156 is eccentrically thrust as indicated in comparative manner by line P—P in FIGS. 8A and 8B by the coupling rod 131 pivotally mounted on lever means 124 and 125 at a thicker lining portion 179 thereof, so as to be progressively worn in the thicker lining portion 179 as compared with a thinner portion 180. When the mechanical brake is applied, the brake disk 114 is engaged with the thicker lining portion 179 of the first pad assembly 156 and with a thicker lining portion 178 of the second pad assembly 157, so that both of the friction linings 158 and 160 are evenly worn as shown in FIG. 8A.

I claim:

1. In a mechanical brake system having a brake disc rotatable with a wheel and a fixed support, the improvement comprising:

a "C"-shaped caliper member pivotally mounted on the fixed support on one side of the brake disc and straddling a portion thereof, guide pin means fixed to said caliper member, two friction pad assemblies disposed on opposite sides of the brake disc and slidably supported on said guide pin means within said caliper means for engaging said brake disc, lever plate means pivotally mounted on said caliper member and provided with elongated slots therein, means pivotally mounted on said lever plate means for pressing one friction pad assembly against one side of the brake disk, link means connected to said caliper member and pivotally mounted at one end thereof in the elongated slots in said lever plate means to slide and rotate therein when said link means is pivoted, means for manually operating the other end of said link means for pivoting said link means, whereby when said link means is pivoted by said manually operated means, said lever plate means will actuate said pressing means to press one friction pad assembly toward the brake disc and said caliper member by reaction force will pivot substantially axially of said brake disc to move said other friction pad assembly toward the brake disc.

2. In a brake system as claimed in claim 1 the improvement further comprising a return spring means disposed between said lever plate means and said link means urging both said means to the released position.

3. In a brake system as claimed in claim 1 wherein said lever plate means comprises two lever plate elements and wherein said link means comprises coupled bell Xcrank means disposed between said two lever plate elements.

4. In a brake system as claimed in claim 1 wherein one of said friction pad assemblies includes a lining which is tapered towards its trailing edge and the other of said pad assemblies is tapered toward its leading edge, and wherein said pressing means presses said first-mentioned pad assembly at a point nearer the thicker leading edge than the trailing edge.

5. In a brake system as claimed in claim 1 the improvement wherein said pressing means comprises a coupling rod pivotally mounted on said lever plate means, a bolt secured to said coupling rod and extending parallel to the axis of the brake disc and a piston slidably mounted in said caliper member and actuated by said bolt to press one of said friction pad assemblies.

6. In a brake system as claimed in claim 5 the improvement wherein said bolt is adjustable with respect to said coupling rod to compensate for wear on said friction pad assemblies.